United States Patent
Kim et al.

(10) Patent No.: US 10,836,673 B2
(45) Date of Patent: Nov. 17, 2020

(54) GLASS COMPOSITION, PREPARATION METHOD OF GLASS COMPOSITION, AND COOKING APPLIANCE

(71) Applicant: LG ELECTRONICS INC., Seoul (KR)

(72) Inventors: Namjin Kim, Seoul (KR); Youngseok Kim, Seoul (KR); Yunsung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 159 days.

(21) Appl. No.: 15/885,572

(22) Filed: Jan. 31, 2018

(65) Prior Publication Data
US 2018/0215655 A1   Aug. 2, 2018

(30) Foreign Application Priority Data
Feb. 2, 2017   (KR) .......................... 10-2017-0014834

(51) Int. Cl.
*C03C 8/14* (2006.01)
*C03C 8/08* (2006.01)
(Continued)

(52) U.S. Cl.
CPC ............... *C03C 8/14* (2013.01); *C03B 1/00* (2013.01); *C03B 27/028* (2013.01); *C03C 3/064* (2013.01);
(Continued)

(58) Field of Classification Search
CPC .. C03C 2/064; C03C 4/20; C03C 8/08; C03C 8/14; C03C 2207/02; C03C 3/064; C03C 3/066
(Continued)

(56) References Cited

U.S. PATENT DOCUMENTS 2,436,825 A    3/1948  Prior
6,492,622 B2 * 12/2002 Melson ................... C03C 10/00
                                                           219/452.11
(Continued)

FOREIGN PATENT DOCUMENTS

KR    1020110023079 A    3/2011
KR    1020130125918 A    11/2013

*Primary Examiner* — Edelmira Bosques
*Assistant Examiner* — Nikhil P Mashruwala
(74) *Attorney, Agent, or Firm* — Dentons US LLP

(57) ABSTRACT

A glass composition formed of a glass frit including $P_2O_5$, $SiO_2$, $B_2O_3$, $Al_2O_3$, $ZrO_2$ and group I-based oxide, wherein $P_2O_5$ is contained in an amount of 20 wt % to 40 wt % based on a total weight of the glass frit, $SiO_2$ is contained in an amount of to wt % to 30 wt % based on the total weight of the glass frit, $B_2O_3$ is contained in an amount of 3 wt % to 20 wt % based on the total weight of the glass frit, $Al_2O_3$ is contained in an amount of 7 to 24 wt % based on the total weight of the glass frit, $ZrO_2$ is contained in an amount of 1 wt % to 7 wt % based on the total weight of the glass frit, and the group I-based oxide is contained in an amount of 7 wt % to 28 wt % based on the total weight of the glass frit.

11 Claims, 2 Drawing Sheets

(51) Int. Cl.
*F24C 15/00* (2006.01)
*C03C 4/20* (2006.01)
*C03C 3/064* (2006.01)
*A47J 37/07* (2006.01)
*C03B 1/00* (2006.01)
*C03B 27/02* (2006.01)
*C03C 3/066* (2006.01)
*C03C 8/16* (2006.01)

(52) U.S. Cl.
CPC ............... *C03C 3/066* (2013.01); *C03C 4/20* (2013.01); *C03C 8/08* (2013.01); *C03C 8/16* (2013.01); *F24C 15/005* (2013.01); *A47J 37/07* (2013.01); *C03C 2207/00* (2013.01); *C03C 2207/02* (2013.01)

(58) Field of Classification Search
USPC ..................................................... 126/39 B
See application file for complete search history.

(56) References Cited

U.S. PATENT DOCUMENTS

| | | | |
|---|---|---|---|
| 7,005,396 B2 * | 2/2006 | Espargilliere | C03C 3/19 501/24 |
| 7,456,121 B2 * | 11/2008 | Comte | C03C 1/004 501/4 |
| 8,410,404 B2 | 4/2013 | Baek et al. | |
| 2009/0018007 A1 * | 1/2009 | Siebers | C03C 3/095 501/63 |
| 2011/0049122 A1 | 3/2011 | Baek | |
| 2011/0146776 A1 * | 6/2011 | Carroll | C03C 8/06 136/256 |
| 2013/0231236 A1 * | 9/2013 | Kawai | C03C 3/097 501/63 |
| 2013/0299482 A1 | 11/2013 | Kim et al. | |
| 2013/0299483 A1 * | 11/2013 | Kim | C03C 3/21 219/391 |
| 2015/0111717 A1 * | 4/2015 | Gabel | C03C 3/087 501/32 |

\* cited by examiner

GLASS COMPOSITION, PREPARATION METHOD OF GLASS COMPOSITION, AND COOKING APPLIANCE

CROSS-REFERENCE TO RELATED APPLICATION

This application claims the benefit of Korean patent application No. 10-2017-0014834, filed on Feb. 2, 2017, the entire content of which is incorporated herein by reference.

BACKGROUND

Field of the Present Disclosure

The present disclosure relates to a glass composition, a method of manufacturing the composition, and a cooking appliance including the composition.

Discussion of Related Art

Enamel refers to a glass glaze coated on a surface of a metal plate. Enamel may be used for cooking appliances, such as microwave ovens and ovens. Enamel may be classified as an oxidation-resistant enamel which can prevent oxidation, or a heat-resistant enamel which can withstand high temperature, depending on the kind or use of glaze. Depending on the material added into the enamel, enamel may be classified into aluminum enamel, zirconium enamel, titanium enamel, and soda glass enamel.

In general, a cooking appliance refers to a device that heats and cooks food using a heating source. The food waste generated in the cooking process contacts the inner wall of the cavity portion of the cooking appliance. Therefore, when the food is cooked in the cooking appliance, it is necessary to clean the inside of the cavity portion. In addition, because cooking generally involves high temperature, the inner wall of the cavity portion may be exposed to the organic substance and the alkali ingredient. Therefore, when enamel is used therein, such enamel requires heat resistance, chemical resistance, abrasion resistance and contamination resistance. Therefore, there is a need for a composition for enamel for improving the heat resistance, chemical resistance, abrasion resistance and contamination resistance of enamel.

Particularly, in order to easily clean the enamel used in the oven, a pyrolisis method of burning contaminants at high temperature, a method of using a strong alkaline detergent, or a water soaking may be used. Accordingly, because the enamel is exposed to a high-temperature or high-alkali detergent, the enamel requires high heat resistance and chemical resistance.

SUMMARY

The present invention has been made in order to solve the above at least the above problems associated with the conventional technology.

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

Embodiments of the present invention provide a glass composition with improved cleanability properties and a cooking appliance including the composition.

Embodiments of the present invention provide a glass composition comprising a glass frit including $P_2O_5$, $SiO_2$, $B_2O_3$, $Al_2O_3$, $ZrO_2$ and group I-based oxide, wherein $P_2O_5$ is contained in an amount of 20 wt % to 40 wt % based on a total weight of the glass frit, $SiO_2$ is contained in an amount of to wt % to 30 wt % based on the total weight of the glass frit, $B_2O_3$ is contained in an amount of 3 wt % to 20 wt % based on the total weight of the glass frit, $Al_2O_3$ is contained in an amount of 7 to 24 wt % based on the total weight of the glass frit, $ZrO_2$ is contained in an amount of 1 wt % to 7 wt % based on the total weight of the glass frit, the group I-based oxide is contained in an amount of 7 wt % to 28 wt % based on the total weight of the glass frit.

According to embodiments of the present disclosure, the glass composition may have improved cleanability properties. Accordingly, the cooking appliance may be cleaned with only water-soaking.

That is, although the inner face of the door and the inner face of the cavity portion may be contaminated by food and organic substances generated during the cooking process while the heating space (also referred to as a cooking space) defined in the cavity portion of the cooking appliance is closed, the inner face of the door and the inner face of the cavity portion may be easily cleaned with only the water-soaking.

Further, because the functional layer coated by the glass composition according to an embodiment of the invention has excellent cleanability properties, the inner surface of the cooking appliance can be easily cleaned.

Further, contaminants including oil, such as chicken oil, and sugars can be more easily and quickly removed from the functional layer coated by the glass composition according to the embodiment.

Further, because the functional layer may be directly coated on the inner faces of the cavity portion and the door without a separate buffer layer therebetween, production process efficiency can be improved and a thickness of the cavity portion and door due to the coating of the functional layer can be minimized.

Further, because the glass composition according to an embodiment of the invention has a softening point greater than a predetermined temperature and a proper thermal expansion coefficient, the composition can withstand cooking and cleaning at a high temperature for a relatively long time.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTIONS

Figure 1:
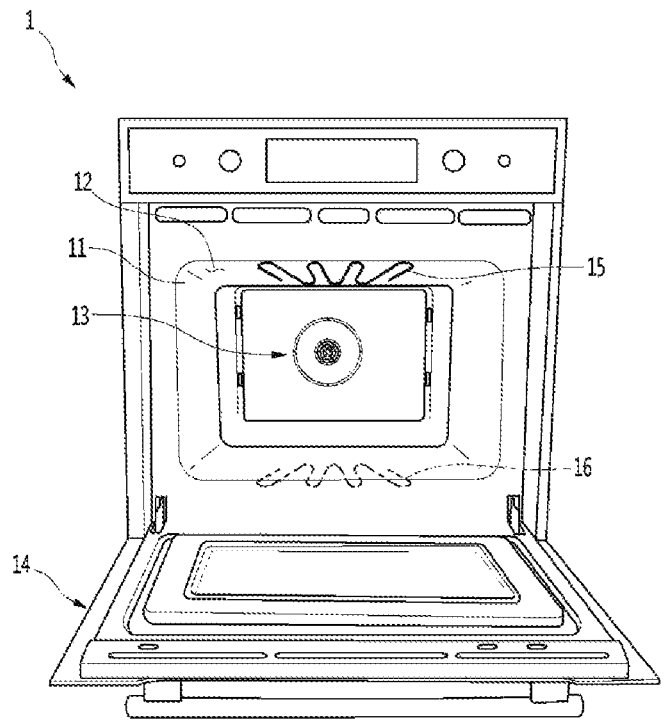
FIG. 1 is a front view of a cooking appliance according to an embodiment of the invention.

For simplicity and clarity of illustration, elements in the figures are not necessarily drawn to scale. The same reference numbers in different figures denote the same or similar elements, and as such perform similar functionality. Also, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, numerous specific details are set forth in order to provide a thorough understanding of the present disclosure. The present disclosure may be practiced without some or all of these specific details. In other instances, well-known process structures and/or processes have not been described in detail in order not to unnecessarily obscure the present disclosure.

Hereinafter, a glass composition according to an embodiment of the present invention and a cooking appliance including the same will be described with reference to the drawings.

Of the terms described below, the term "adherence" is generally understood to refer to the pre-firing coatability of the glass composition, and the term "adhesion" is generally understood to refer to post-firing coatability thereof.

FIG. 1 is a front view of a cooking appliance according to an embodiment of the invention. Referring to FIG. 1, a cooking device or appliance 1 may include a cavity portion 11 having a heating space 12 defined therein; a door 14 configured to selectively open and close the heating space 12; and at least one heat source configured to supply heat for heating food to be cooked within the heating space 12.

The cavity portion 11 may be formed in a hexahedral shape (not limited thereto) with the front face opened. The heat source may include the following components: a convection assembly 13 for discharging heated air into the cavity in the cavity portion 11, an upper heater 15 disposed on the upper inner face of the cavity portion 11, and a lower heater 16 disposed on a lower inner face of the cavity portion 11. It is understood that the heat source does not need to include all of the convection assembly 13, the upper heater 15 and the lower heater 16, and it may include other components. For example, the heat source may include at least one of the convection assembly 13, the upper heater 15, and the lower heater 16. The upper heater 15 and/or the lower heater 16 may be provided inside or outside the cavity of the cavity portion 11.

Referring to FIGS. 2-5, a functional layer may be disposed on the inner face of the cavity portion 11 and/or on the inner face of the door 14. The functional layer may comprise a glass composition as described in more detail below. The functional layer may be coated or disposed on the inner face of the cavity portion 11 and/or the inner face of the door 14. That is, the functional layer may be a coating layer. The functional layer can improve the heat resistance, chemical resistance and stain resistance of the inner face of the cavity portion 11 and the inner face of the door 14.

Figure 2:
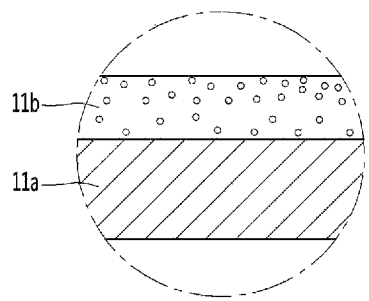
FIG. 2 is an enlarged cross-sectional view of a portion of the inner face of the cavity portion of FIG. 1.
Figure 3:
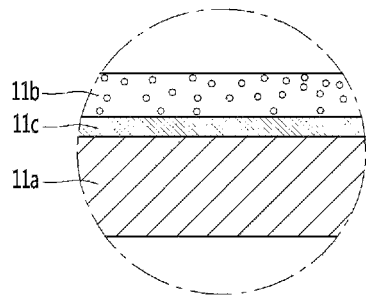
FIG. 3 is an enlarged cross-sectional view of a portion of the inner face of the cavity portion of FIG. 1.

Referring to FIGS. 2 and 3, the functional layer may be coated or disposed on surfaces that form the cavity portion. The cavity portion 11 may include a metal layer 11a, and a functional layer 11b on the metal layer 11a. The metal layer 11a may form the base of the cavity portion.

Referring to FIG. 2, the functional layer 11b may be disposed in direct contact with the metal layer 11a.

Alternatively, referring to FIG. 3, the functional layer 11b may be in indirect contact with the metal layer 11a. In such arrangement, for example, a buffer layer 11c may be disposed between the metal layer 11a and the functional layer 11b. The buffer layer 11c may comprise an adhesive layer. Thus, the adhesion between the metal layer 11a and the functional layer 11b can be improved as a result of the buffer layer 11c.

Figure 4:
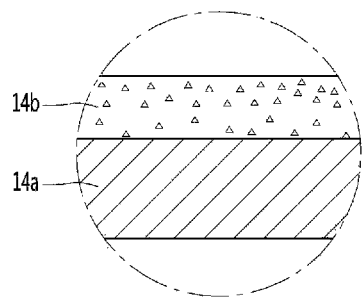
FIG. 4 is an enlarged view of a portion of the inner face of the door of FIG. 1.
Figure 5:
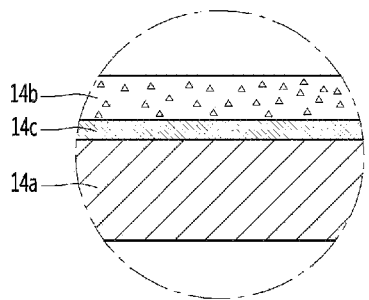
FIG. 5 is an enlarged view of a portion of the inner face of the door of FIG. 1.

Referring to FIGS. 4 and 5, the functional layer may be disposed on the inner face of the door 14. For example, the functional layer may be disposed on the inner face of the door 14 facing the heating space 12 with the heating space 12 being closed. The functional layer can improve the heat resistance, chemical resistance and stain resistance of the inner face of the door 14.

The door 14 may include a metal layer 14a, and a functional layer 14b disposed on the metal layer 14a. The metal layer 14a may form the base of the cavity portion.

Referring to FIG. 4, the functional layer 14b may be disposed in direct contact with the metal layer 14a.

Alternatively, referring to FIG. 5, the functional layer 14b may be disposed in indirect contact with the metal layer 14a. In detail, a buffer layer 14c may be disposed between the metal layer 14a and the functional layer 14b. The buffer layer 14c may comprise an adhesive layer. That is, the adhesion between the metal layer 14a and the functional layer 14b can be improved by the buffer layer 14c.

The functional layer may be formed by coating or applying the glass composition on the inner face of the cavity portion 11 or on the inner face of the door 14. For example, the functional layer may be coated on the inner face of the cavity portion 12 and on the inner face of the door 14 so that the inner face of the cavity portion 12 and the inner face of the door 14 have improved heat resistance, chemical resistance and stain resistance.

Hereinafter, the glass composition coated on the inner faces of the cavity portion and door of the cooking appliance will be described.

The glass composition may be an enamel composition.

The glass composition according to an embodiment of the invention may include glass frit including $P_2O_5$, $SiO_2$, $B_2O_3$, $Al_2O_3$, $ZrO_2$ and group I-based oxide.

The $P_2O_5$ may be contained at up to about 40 wt % based on the total weight of the glass frit. Specifically, the $P_2O_5$ may be present in an amount of about 20 wt % to about 40 wt % based on the total weight of the glass frit. More specifically, the $P_2O_5$ may be present in an amount from about 25 wt % to about 35 wt % based on the total weight of the glass frit.

The $P_2O_5$ may be included in the glass composition to improve cleanability properties of the glass composition. Further, the $P_2O_5$ may be included in the glass composition to improve the hydrophilicity of the glass composition.

Figure 6:
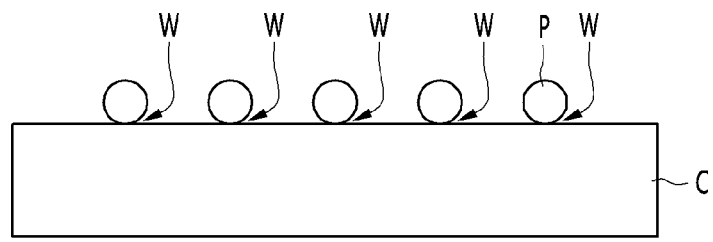
FIG. 6 is a view for illustrating that contaminants are removed from the coating layer.

Accordingly, as shown in FIG. 6, due to the presence of $P_2O_5$, the coating layer containing the glass composition is hydrophilic. Thus, after water-soaking, water can effectively penetrate the interface between the coating layer and the contaminants on the coating layer, and the contaminants can be more easily removed from the coating layer.

If $P_2O_5$ is included at less than about 20 wt % based on the total weight of the glass frit, the cleanability properties of the glass composition may be degraded. Further, if $P_2O_5$ is included in an amount of more than about 40 wt % based on the total weight of the glass frit, the thermal properties of the glass composition may be degraded, the vitrification of the glass composition and adherence of the glass composition may be degraded.

The group I-based oxide includes at least one metal oxide selected from a group consisting of $Li_2O$, $Na_2O$ and $K_2O$. Specifically, the group I-based oxide may include $Na_2O$, $K_2O$ and $Li_2O$. That, the glass frit may contain all of $Na_2O$, $K_2O$ and $Li_2O$.

The group I-based oxide may be contained up to about 29 wt % based on the total weight of the glass frit. Specifically, the group I-based oxide may be contained at from about 7 wt % to about 28 wt % based on the total weight of the glass frit. More specifically, the group I-based oxide may be contained at from about 12 wt % to about 23 wt % based on the total weight of the glass frit.

The group I-based oxide may be included in the glass composition to improve the cleanability properties and durability of the glass composition and reduce the melting temperature.

That is, the group I-based oxide can improve the cleanability properties of the glass composition together with the $P_2O_5$. For example, $Na_2O$ and $K_2O$ may be incorporated in the glass composition to improve the cleanability properties of the glass composition. Further, $Li_2O$ may be incorporated in the glass composition to improve the durability of the glass composition.

If the group I-based oxide is contained at less than about 7 wt % based on the total weight of the glass frit, the cleanability properties and durability of the glass composition may be degraded. Further, when the group I-based oxide is contained in an amount exceeding about 28 wt % based on the total weight of the glass frit, the thermal properties of the glass composition may be deteriorated and the vitrification may not be achieved.

For example, if the glass frit contains all of $Na_2O$, $K_2O$ and $Li_2O$, $Na_2O$, $K_2O$ and $Li_2O$ may be included as follows.

$Na_2O$ may be present in an amount of about 3 wt % to about 9 wt % based on the total weight of the glass frit. Specifically, the $Na_2O$ may be present in an amount of about 5 wt % to about 7 wt % based on the total weight of the glass frit.

$K_2O$ may be present at about 7 wt % to about 14 wt % based on the total weight of the glass frit. Specifically, $K_2O$ may be present at about 9 wt % to about 12 wt % based on the total weight of the glass frit.

If contents of $Na_2O$ and the $K_2O$ are out of the range specified above, the cleanability properties of the glass composition may be degraded.

The $Li_2O$ may be present in an amount of about 0.1 wt % to about 1.5 wt % based on the total weight of the glass frit. Specifically, $Li_2O$ may be present in an amount of about 0.5 wt % to about 1 wt % based on the total weight of the glass frit.

If content of $Li_2O$ is out of the range specified above, the durability is degraded and vitrification may not be achieved. $P_2O_5$, $Na_2O$, $K_2O$, and $Li_2O$ may form an alkali phosphate glass structure. Further, $P_2O_5$, $Na_2O$, $K_2O$, and $Li_2O$ may impart improved cleanability and durability properties to glass compositions according to the embodiments of the invention.

That is, according to the embodiment, because the glass frit contains $P_2O_5$, $Na_2O$, $K_2O$, and $Li_2O$, the functional layer can be more easily cleaned by water when the functional layer formed by the glass composition is contaminated by food or the like.

$SiO_2$ may be present at up to about 30 wt % based on the total weight of the glass frit. Specifically, $SiO_2$ may be present in an amount of from about 10 wt % to about 30 wt % based on the total weight of the glass frit. More specifically, $SiO_2$ may be present in an amount from about 15 wt % to about 25 wt % based on the total weight of the glass fit.

$SiO_2$ may be incorporated in the glass composition to form a glass structure of the glass composition, to improve the skeleton of the glass structure, and to improve the acid resistance of the glass frit. In particular, due to $SiO_2$, the glass composition may have improved acid resistance. Further, $SiO_2$ is contained in the glass composition to improve the water resistance. In other words, $SiO_2$ is contained in the glass composition, to prevent the functional layer formed of the glass composition from absorbing water. If $SiO_2$ content is less than about to wt % based on the total weight of the glass fit, the glass structure of the glass composition may be degraded, resulting in a reduction in durability, acid resistance, and water resistance of the functional layer.

Further, if $SiO_2$ is contained in an amount exceeding about 30 wt % based on the total weight of the glass frit, the cleanability properties of the glass fit may be lowered.

$B_2O_3$ may be present at up to about 20 wt % based on the total weight of the glass fit. Specifically, $B_2O_3$ may be present in an amount of about 3 wt % to about 20 wt % based on the total weight of the glass fit. More specifically, $B_2O_3$ may be contained at from about 8 wt % to about 15 wt %, based on the total weight of the glass frit.

$B_2O_3$ can enlarge the vitrification region of the glass frit and appropriately control the thermal expansion coefficient of the glass composition according to the embodiment.

Further, $B_2O_3$ is contained in the glass composition, allowing each component contained in the glass composition to be dissolved uniformly prior to firing.

When $B_2O_3$ is contained at less than about 3 wt % based on the total weight of the glass frit, the vitrification area is reduced and thus the glass structure is degraded, thereby reducing the durability of the functional layer. Further, if $B_2O_3$ content is greater than about 20 wt % based on the total weight of the glass frit, the cleanability properties of the glass frit may be degraded.

$Al_2O_3$ may be present at up to about 24 wt % based on the total weight of the glass frit. Specifically, $Al_2O_3$ may be present in an amount of about 7 wt % to about 24 wt % based on the total weight of the glass frit. More specifically, $Al_2O_3$ may be present in an amount from about 12 wt % to about 19 wt % based on the total weight of the glass frit.

$Al_2O_3$ may be incorporated in the glass composition to improve the chemical durability of the glass composition and improve the heat resistance and surface hardness. If the $Al_2O_3$ is contained at less than about 7 wt % based on the total weight of the glass frit, the chemical resistance and durability of the glass composition may be reduced. Further, when $Al_2O_3$ is contained in an amount of more than about 24 wt % based on the total weight of the glass frit, the cleanability properties of the glass frit may be degraded, adhesion may be lowered due to an increase in firing temperature and melting temperature, and production process efficiency may be reduced.

$ZrO_2$ may be present at up to about 7 wt % based on the total weight of the glass frit. Specifically, $ZrO_2$ may be present at about 1 wt % to about 7 wt %, based on the total weight of the glass frit. More specifically, $ZrO_2$ may be present in an amount from about 3 wt % to about 5 wt % based on the total weight of the glass frit.

$ZrO_2$ may be incorporated into the glass composition to improve the chemical durability of the glass composition.

If $ZrO_2$ is contained at less than about 1 wt % based on the total weight of the glass frit, the chemical resistance and durability of the glass composition can be reduced. Further, when $ZrO_2$ is contained in an amount of more than about 7 wt % based on the total weight of the glass frit, the cleanability properties of the glass frit may be degraded, the vitrification may not be achieved, and the adhesion may be degraded due to increase in the melting temperature thereof.

That is, $Al_2O_3$ and $ZrO_2$ may improve the chemical durability of the glass fit. In particular, $Al_2O_3$ and $ZrO_2$ may improve the chemical durability of the alkali phosphate glass structure formed by $P_2O_5$, $Na_2O$, IGO and $LiO_2$ via structural stabilization.

The glass frit according to the embodiment of the invention may have increased content of $P_2O_5$ and decreased content of $SiO_2$ to realize improved cleanability. Accordingly, the durability of the glass composition may be decreased due to the decrease of $SiO_2$ forming the glass structure. However, the durability of the glass composition may be maintained or prevented from being lowered by controlling the contents of $Al_2O_3$ and $ZrO_2$ as defined above.

That is, even though the content of $SiO_2$ is reduced, the durability of the glass composition according to the embodiment of the invention may be maintained by adding $Al_2O_3$ and $ZrO_2$ having rigid characteristics.

The glass frit may further include at least one of $TiO_2$ and SnO. For example, the glass frit may include both $TiO_2$ and SnO.

$TiO_2$ may be contained at less than about 8 wt % based on the total weight of the glass frit. Specifically, $TiO_2$ may be present at about 1 wt % to about 8 wt %, based on the total weight of the glass frit. More specifically, $TiO_2$ may be present in an amount of about 3 wt % to about 6 wt % based on the total weight of the glass frit.

SnO may be contained at less than about 2 wt % based on the total weight of the glass fit. Specifically, SnO may be contained at from about 0.1 wt % to about 2 wt % based on the total weight of the glass fit. More specifically, SnO may be contained at from about 0.1 wt % to about 0.5 wt %, based on the total weight of the glass fit.

SnO may function to adjust the surface tension of the coating film formed by the glass composition appropriately and improve the chemical resistance. Further, $TiO_2$ improves opacity of the glass composition according to the embodiment and improves the chemical composition of the glass composition. That is, $TiO_2$ can improve the opacity of the coating layer of the glass composition coated as the functional layer.

When $TiO_2$ is contained at less than about 1 wt % based on the total weight of the glass fit or when SnO is contained at less than about 0.1 wt % based on the total weight of the glass frit, the opacity of the glass composition may be lowered such that the color of the buffer layer or the color of the base may be viewed from the outside. Further, if $TiO_2$ is contained in an amount greater than about 8 wt % based on the total weight of the glass frit, or SnO is contained in an amount greater than about 0.1 wt % based on the total weight of the glass fit, cleanability properties of the glass composition may be degraded.

The glass fit may further include a group II-based oxide and ZnO. The group II-based oxide may be selected from CaO, BaO, or MgO. Specifically, the group II-based oxide may include CaO, BaO and MgO. That is, the glass frit may include at least one of CaO, BaO, MgO, and ZnO.

Each of the group II-based oxide and/or the ZnO may be contained in an amount of up to about to wt % based on the total weight of the glass fit. Specifically, each of the group II-based oxide and/or the ZnO may be contained in an amount of about 0.1 wt % to about to wt % based on the total weight of the glass frit. More specifically, each of the group II-based oxide and/or the ZnO may be present in an amount of about 3 wt % to about 7 wt % based on the total weight of the glass fit.

The group II-based oxide and the ZnO can improve the durability and surface tension of the glass composition. Accordingly, the coatability of the glass composition can be improved.

If each of the group II-based oxide and/or ZnO is contained at less than about 0.1 wt % based on the total weight of the glass frit, the chemical composition, surface tension and durability of the glass composition may be reduced. Further, if each of the group II-based oxide and/or the ZnO is contained in an amount exceeding about to wt % based on the total weight of the glass frit, the cleanability properties of the glass frit may be degraded.

The glass frit may further contain fluorinated compounds. The fluorinated compound may be selected from NaF, $CaF_2$ or $AlF_3$. Specifically, the fluorinated compound may include NaF, $CaF_2$ and $AlF_3$. That is, the glass frit may contain all of NaF, $CaF_2$ and $AlF_3$.

The fluorinated compound may function to properly control the surface tension of the coating formed by the glass composition. Further, the fluorinated compound may allow the vitrification area of the glass frit to be enlarged, and allow the melting temperature of the glass composition to be lowered.

The fluorinated compound may be contained at up to about 5 wt % based on the total weight of the glass frit.

Specifically, the fluorinated compound may be contained at from about 0.1 wt % to about 5 wt %, based on the total weight of the glass frit. More specifically, the fluorinated compound may be present in an amount of about 1 wt % to about 4 wt % based on the total weight of the glass frit.

When the fluorinated compound is contained at less than about 0.1 wt % based on the total weight of the glass frit, the vitrification area is reduced and thus the glass structure is degraded, thereby decreasing the durability of the functional layer. Further, if the fluorinated compound is contained in an amount greater than about 5 wt % based on the total weight of the glass frit, the cleanability properties of the glass frit may be degraded.

The glass frit may further include at least one of $Co_3O_4$, NiO, $Fe_2O_3$ and $MnO_2$. Specifically, the glass frit may include all of $Co_3O_4$, NiO, $Fe_2O_3$ and $MnO_2$.

$Co_3O_4$, NiO, $Fe_2O_3$ and $MnO_2$ may improve the adhesion of the glass composition coated on the base. That is, $Co_3O_4$, NiO, $Fe_2O_3$ and $MnO_2$ may be adhesion-enhancing components that improve adhesion when coating the glass composition on the base.

The presence of $Co_3O_4$, NiO, $Fe_2O_3$ and $MnO_2$ may allow the glass composition to be coated directly on the base, while exhibiting improved adhesion therebetween, without the need for a separate buffer layer, when disposing the glass composition on the base.

For example, when forming the coating layer on a low carbon steel base, the adhesion-enhancing component may react with an iron oxide in the base to improve adhesion between the coating layer and the base.

Accordingly, the overall thickness of the cavity portion and/or door having the glass composition coated thereon may be reduced, and, thus, the manufacturing process efficiency can be improved.

$Co_3O_4$, NiO, $Fe_2O_3$ and $MnO_2$ may be included at up to about 5 wt % based on the total weight of the glass fit. Specifically, $Co_3O_4$, NiO, $Fe_2O_3$ and $MnO_2$ may be present in an amount of about 1 wt % to about 5 wt % based on the total weight of the glass frit. More specifically, $Co_3O_4$, NiO, $Fe_2O_3$ and $MnO_2$ may be present in an amount of about 2 wt % to about 4 wt % based on the total weight of the glass fit.

The diameter of the glass frit may be about 1 to 50 μm. Further, the glass frit may be dispersed in a solvent such as acetone or water. That is, the glass composition according to the embodiment may be used in a dispersion form in which the glass frits are dispersed in the solvent. Further, the glass composition according to an embodiment may further include an organic binder. That is, the enamel composition according to the embodiment may be used in the form of a paste.

The glass composition according to the embodiment may be prepared by the following method.

First, a glass frit material to form the glass frit may be prepared. The glass fit material may include $P_2O_5$, $SiO_2$, $B_2O_3$, $Al_2O_3$, $ZrO_2$ and group I-based oxide. The group I-based oxide includes at least one metal oxide selected from a group consisting of $Li_2O$, $Na_2O$ and $K_2O$, The glass frit material may further include at least one of $TiO_2$ and SnO. The glass fit material may further comprise a group II-based oxide. The glass frit material may further include at least one of ZnO CaO, MgO and BaO. The glass frit material may further include at least one of NaF, $CaF_2$ and $AlF_3$. Further, the glass frit material may further include at least one of $Co_3O_4$, NiO, $Fe_2O_3$ and $MnO_2$.

The glass frit material may then be melted. For example, the glass fit material may be melted for about 30 minutes to about 2 hours at a temperature of about 1100° C. to about 1500° C.

The melted glass frit material may then be quenched using a chiller or water. Accordingly, the glass frit may be formed. In this connection, depending on the content of each component contained in the glass frit material, the content of each component of the formed glass frit may be determined. That is, the content of each component contained in the glass frit material may be substantially the same as the content of each component of the glass frit.

The glass frits may then be dispersed in a solvent such as acetone. The solvent may then be dried. Once dry, the glass frits may then be filtered by a mesh structure or the like. In particular, the glass frits may be filtered to have a diameter of about 50 μm or less.

In this way, an enamel composition including the glass frit may be formed.

Then, in a non-limiting example, the enamel composition according to the embodiment may form the functional layer by the following method.

Once a glass composition according to an embodiment of the invention may be used in a dispersion in which the glass fits are dispersed in a solvent such as water. That is, the glass frits may be dispersed in a solvent. The glass composition according to the embodiment may then be coated on a face of an object to be coated by a spraying process or other like application. The object of interest may be a metal plate or a reinforced glass plate. For example, the object of interest may be an entirety or a portion of the cooking device.

Alternatively, the glass composition according to the embodiment may be coated on the object in a dried state. For example, depending on the embodiments, the glass composition may be coated on the object by electrostatic attraction.

Thereafter, the object coated with the enamel composition according to the embodiment may be fired for about 100 seconds to about 600 seconds at a temperature of about 700° C. to about 900° C.

In this way, the glass composition according to an embodiment forms a coating layer on the object, and thus the functional layer including the glass composition may be formed on the object.

The glass composition according to an embodiment may have a glass deformation temperature TD of about 500° C. or higher by appropriately adjusting the composition of the glass frit material, thereby realizing high heat resistance. Accordingly, the glass composition according to the embodiment may be more efficiently applied to the cooking appliance or the like.

Hereinafter, the present disclosure will be described in more detail based on glass composition manufacturing methods according to embodiments of the invention and comparison examples. The embodiments are merely examples to illustrate the present disclosure in more detail and are non-limiting.

Exemplar Present Embodiment 1

The following is an exemplar embodiment of the invention, identified as exemplar present embodiment 1.

The glass frit material was provided as in Table 1 below.

At this time, $NH_4H_2PO_4$ was used as the starting material for $P_2O_5$; $Na_2CO_3$, $K_2CO_3$, $Li_2CO_3$ were used as starting materials for $Na_2O$, $K_2O$, $Li_2O$ respectively; $CaCO_3$, $BaCO_3$ were used as starting materials for BaO and CaO, respectively; remaining components were the same as those shown in Table 1.

Then, after mixing the glass frit materials, the mixture was melted at a temperature of about 1400° C. for about 1 hour to about 2 hours and subsequently quenched in a quenching roller to obtain glass cullet.

Subsequently, about 0.1 wt % to about 1 wt % of organic polysiloxane was added to the glass cullet, followed by milling and grinding in a ball mill for about 4 hours to about 6 hours. The crushed cullet passes through a 325 mesh sieve. As a result, the glass frits were formed to have a particle diameter of about 44 μm or less.

Then, the glass frits were sprayed onto a low carbon steel sheet having a size of 200×200 mm and a thickness of 1 mm or less using a corona discharge gun. In this connection, the voltage of the corona discharge gun was controlled to 40 kV to 100 kV.

The amount of glass frits sprayed on the low carbon steel sheet was 300 g/m².

Then, the low carbon steel having the glass fits sprayed thereon was fired at a temperature of 830° C. to 870° C. for 300 seconds to 450 seconds to form a functional layer on a face of the low carbon steel.

Exemplar Present Embodiment 2

The following is another exemplar embodiment of the invention, identified as exemplar present embodiment 2.

The functional layer was formed in the same manner as the exemplar embodiment 1 except glass frit materials were provided as shown in Table 1 below.

Present Embodiment 3

The following is another exemplar embodiment of the invention, identified as exemplar present embodiment 3.

The functional layer was formed in the same manner as the exemplar embodiment 1 except glass frit materials were provided as shown in Table 1 below.

Exemplar Present Embodiment 4

The following is another exemplar embodiment of the invention, identified as exemplar present embodiment 4.

The functional layer was formed in the same manner as the exemplar embodiment 1 except glass frit materials were provided as shown in Table 1 below.

Exemplar Present Embodiment 5

The following is another exemplar embodiment of the invention, identified as exemplar present embodiment 5.

The functional layer was formed in the same manner as the exemplar embodiment 1 except glass frit materials were provided as shown in Table 1 below.

Comparison Example 1

The following is a comparison example, identified as comparison example 1.

The functional layer was formed in the same manner as the exemplar embodiment 1 except glass frit materials were provided as shown in Table 2 below.

Comparison Example 2

The following is a comparison example, identified as comparison example 2.

The functional layer was formed in the same manner as the exemplar embodiment 1 except glass frit materials were provided as shown in Table 2 below.

TABLE 1

| composition wt % | embodiment1 | embodiment2 | embodiment3 | embodiment4 | embodiment5 |
|---|---|---|---|---|---|
| $P_2O_5$ | 30.7 | 33.7 | 25.5 | 25.0 | 27.7 |
| $SiO_2$ | 14.1 | 11.1 | 13.3 | 15.7 | 14.8 |
| $B_2O_3$ | 12.2 | 12.2 | 12.0 | 14.6 | 10.9 |
| $Na_2O$ | 8.5 | 8.5 | 6.6 | 5.0 | 4.7 |
| $K_2O$ | 11.4 | 11.4 | 11.6 | 11.3 | 10.7 |
| $Li_2O$ | — | — | 1.0 | 0.9 | 0.4 |
| $Al_2O_3$ | 8.0 | 8.0 | 17.3 | 16.0 | 19.3 |
| $ZrO_2$ | 1.0 | 1.0 | 2.7 | 2.6 | 2.0 |
| $TiO_2$ | 1.0 | 1.0 | 4.0 | 1.0 | 1.4 |
| SnO | — | — | — | 2.0 | 1.2 |
| ZnO | 5.1 | 5.1 | — | — | — |
| CaO | — | — | 1.0 | 1.0 | — |
| MgO | — | — | — | 0.4 | — |
| BaO | 4.0 | 4.0 | — | — | 1.5 |
| NaF | — | — | 1.9 | 1.9 | — |
| $CaF_2$ | — | — | — | — | 2.7 |
| $AlF_3$ | 1.0 | 1.0 | — | — | — |
| $Co_3O_4$ | 1.9 | 2.0 | 1.9 | 1.9 | 1.8 |
| NiO | — | — | — | — | 0.7 |
| $Fe_2O_3$ | 0.8 | 1.0 | 1.7 | 0.7 | 0.2 |
| $MnO_2$ | 0.3 | — | — | — | — |

TABLE 2

| composition wt % | comparison example 1 | comparison example 2 |
|---|---|---|
| $P_2O_5$ | 19.1 | 15.4 |
| $SiO_2$ | 26.0 | 35.0 |
| $B_2O_3$ | 9.1 | 15.5 |
| $Na_2O$ | 6.4 | 8.5 |
| $K_2O$ | 11.1 | 3.4 |
| $Li_2O$ | 0.9 | 1.2 |
| $Al_2O_3$ | 19.7 | 11.0 |
| $ZrO_2$ | 2.8 | 3.6 |

TABLE 2-continued

| composition wt % | comparison example 1 | comparison example 2 |
|---|---|---|
| $TiO_2$ | — | 0.6 |
| SnO | — | — |
| ZnO | — | — |
| CaO | — | — |
| MgO | — | — |
| BaO | — | — |
| NaF | 1.9 | 2.4 |
| $CaF_2$ | — | — |
| $AlF_3$ | — | — |
| $Co_3O_4$ | 2.0 | 2.1 |
| NiO | — | 0.3 |
| $Fe_2O_3$ | 1.0 | 0.6 |
| $MnO_2$ | — | 0.4 |

The Applicant then proceeded to characterize the functional layers fabricated by the embodiments and comparison examples.

The softening points Td and the thermal expansion coefficients of the functional layers were measured, and the cleanability of each functional layer were measured by the cleanability test.

To measure the thermal properties of the glass, the pellet specimen was fired under the same conditions as those of the glass composition. After polishing both surfaces of the specimen in parallel with each other, the Td (softening point) and CTE (thermal expansion coefficient) were measured using a TMA (Thermo Mechanical Analyzer) at a temperature increase rate of 10° C./min.

The cleanability was measured by applying a 1 g of chicken oil as a contaminant on the surface of the enamel-coated test body 200×200 mm using a brush. Thereafter, the test body to which the contaminant was applied was placed in a thermostat, and the contaminants were fixed to the body at a temperature of about 250 degree C. and for 1 hour.

After the fixation, the test body was caused to cool naturally, and then the degree of curing thereof was confirmed. Then, the test body was immersed in a water bath at 70° C. for to seconds to 10 minutes. Thereafter, the cured chicken oil and a cheery pie filling as sugar ingredients were wiped out with a wet cloth at a force of 3 kgf or less. A 5 cm-diameter bottom-flatted rod was used to homogenize the wiped area in the contaminated enamel surface. At this time, the number of wiping reciprocations as shown in Table 3 was measured and defined as the cleaning frequency. The evaluation indexes thereof were as shown in Table 4 and Table 5 below.

TABLE 3

| wiping frequency | performance Level |
|---|---|
| equal to or less than 5 | 5 |
| equal to or less than 15 | 4 |
| equal to or less than 25 | 3 |
| equal to or less than 50 | 2 |
| greater than 50 | 1 |

TABLE 4

| | embodiment 1 | embodiment 2 | embodiment 3 | embodiment 4 | embodiment 5 | comparison example 1 | comparison example 2 |
|---|---|---|---|---|---|---|---|
| softening point ° C. | 495.2 | 477.6 | 491.0 | 509.7 | 513.2 | 523.1 | 538.2 |
| thermal expansion coefficient × $10^{-7}$/° C. | 115.0 | 119.1 | 117.6 | 106.1 | 96.6 | 111.1 | 98.7 |

TABLE 5

| | embodiment 1 | embodiment 2 | embodiment 3 | embodiment 4 | embodiment 5 | comparison example 1 | comparison example 2 |
|---|---|---|---|---|---|---|---|
| cleanability | 5 | 5 | 5 | 5 | 5 | 2 | 1 |

Referring to Table 4, it may be seen that the functional layers produced by the glass frits according to the exemplar embodiments 1-5 have a high softening point and thermal expansion coefficient.

That is, the functional layers produced by the glass fits of the exemplar embodiments 1-5 have a softening point of about 500° C. or higher and a thermal expansion coefficient of about too ($10^{-7}$/° C.) or more.

That is, it may be seen that the functional layers formed by the glass frits according to the exemplar embodiments 1-5 have improved durability and chemical resistance.

Further, referring to Table 5, it may be seen that the functional layers formed by the glass frits according to the exemplar embodiments 1-5 have improved cleanability compared to the functional layers formed by the glass frits according to the comparison examples 1 and 2.

The glass composition according to the embodiment may have improved cleanability properties. Thus, the cleanability of the cooking appliance may be improved. Specifically, cooking appliances can be cleaned only with water-soaking.

That is, even when the inner surface of the cavity portion defining the inner space of the cooking appliance, and the inner face of the door facing the heating space in the closed state are contaminated or coated by the food and organic substances generated during the cooking process, these inner faces may be cleaned only by water-soaking.

Further, since the functional layer coated by the glass composition according to the embodiments of the present disclosure is excellent in cleanability, the interior of the cooking appliance can be easily cleaned even with a small energy.

Further, since the functional layer may be directly coated on the inner face of the cavity portion and the inner face of the door without a separate buffer layer, the manufacturing process efficiency may be improved and a thickness increase of the cavity portion and the door due to the coating of the functional layer may be minimized.

Further, since the glass composition according to the embodiment of the invention has a softening point above a predetermined temperature and a high thermal expansion coefficient, it can withstand cooking and cleaning at a high temperature for a long time.

Further, the functional layer coated by the glass composition according to the embodiment of the invention may allow the oil such as the chicken oil and the other contaminant such as saccharides to be efficiently removed with less energy and less time. This may be due to the composition and composition ratio as defined above.

While several embodiments have been described above, the present disclosure is not intended to limit the embodiments. Those skilled in the art will recognize that various changes and modifications may be possible without departing from the essential characteristics of the present invention. For example, each component specifically illustrated in the embodiment may be modified. It is also to be understood that the various modifications and variations are intended to be included within the scope of the present disclosure as defined in the appended claims.

What is claimed is:

1. A glass composition comprising:
    a glass frit comprising $P_2O_5$, $SiO_2$, $B_2O_3$, $Al_2O_3$, $ZrO_2$ group I-based oxide, a fluorinated compound including at least one of NaF, $CaF_2$ and $AlF_3$, and an adhesion-enhancing component including at least one of $Co_3O_4$, NiO, $Fe_2O_3$ and $MnO_2$,
    wherein $P_2O_5$ is contained in an amount that is greater than 25 wt % and less than or equal to 40 wt % based on a total weight of the glass frit,
    $SiO_2$ is contained in an amount that is greater than or equal to 10 wt % and less than or equal to 25 wt % based on the total weight of the glass frit,
    $B_2O_3$ is contained in an amount of 3 wt % to 20 wt % based on the total weight of the glass frit,
    $Al_2O_3$ is contained in an amount of 7 to 24 wt % based on the total weight of the glass frit,
    $ZrO_2$ is contained in an amount of 1 wt % to 7 wt % based on the total weight of the glass frit, and
    the group I-based oxide is contained in an amount of 7 wt % to 28 wt % based on the total weight of the glass frit,
    wherein the fluorinated compounds is contained in an amount of 0.1 wt % to 5 wt % based on the total weight of the glass frit,
    wherein the adhesion-enhancing component is contained in an amount of 1 wt % to 5 wt % based on the total weight of the glass frit,
    wherein the glass frit comprises more $P_2O_5$ than $SiO_2$.

2. The glass composition of claim 1, wherein the group I-based oxide comprises at least one metal oxide selected from a group consisting of $Li_2O$, $Na_2O$ and $K_2O$.

3. The glass composition of claim 1, wherein the glass frit comprises at least one of $TiO_2$ and SnO, and wherein said at least one of $TiO_2$ and SnO is contained in an amount of 1 wt % to 10 wt % based on the total weight of the glass frit.

4. The glass composition of claim 1, wherein the glass frit comprises at least one of a group II-based oxide and ZnO, and
    wherein said at least one of the group II-based oxide and ZnO is contained in an amount of 0.1 wt % to 10 wt % based on the total weight of the glass frit.

5. The glass composition of claim 4, wherein the group II-based oxide comprises at least one oxide selected from a group consisting of CaO, MgO and BaO.

6. A cooking device comprising:
    a cavity portion having a heating space defined therein;
    a door to provide access to the heating space; and
    at least one heat source to supply heat inside the heating space,
    wherein at least one of the cavity portion and the door comprises a metal base, and a functional layer disposed on the metal base,
    wherein the functional layer comprises a glass frit comprising $P_2O_5$, $SiO_2$, $B_2O_3$, $Al_2O_3$, $ZrO_2$ group I-based oxide, a fluorinated compound including at least one of NaF, $CaF_2$ and $AlF_3$, and an adhesion-enhancing component including at least one of $Co_3O_4$, NiO, $Fe_2O_3$ and $MnO_2$,
    wherein $P_2O_5$ is contained in an amount that is greater than 25 wt % and less than or equal to 40 wt % based on a total weight of the glass frit,
    $SiO_2$ is contained in an amount that is greater than or equal to 10 wt % and less than or equal to 25 wt % based on the total weight of the glass frit,
    $B_2O_3$ is contained in an amount of 3 wt % to 20 wt % based on the total weight of the glass frit,
    $Al_2O_3$ is contained in an amount of 7 to 24 wt % based on the total weight of the glass frit,
    $ZrO_2$ is contained in an amount of 1 wt % to 7 wt % based on the total weight of the glass frit, and
    the group I-based oxide is contained in an amount of 7 wt % to 28 wt % based on the total weight of the glass frit,
    wherein the fluorinated compounds is contained in an amount of 0.1 wt % to 5 wt % based on the total weight of the glass frit,
    wherein the adhesion-enhancing component is contained in an amount of 1 wt % to 5 wt % based on the total weight of the glass frit,
    wherein the glass frit comprises more $P_2O_5$ than $SiO_2$.

7. The device of claim 6, wherein the group I-based oxide comprises at least one metal oxide selected from a group consisting of $Li_2O$, $Na_2O$ and $K_2O$.

8. The device of claim 6, wherein the glass frit comprises at least one of $TiO_2$ and SnO, at least one of group II-based oxide and ZnO,
    wherein at least one of $TiO_2$ and SnO is contained in an amount of 1 wt % to 10 wt % based on the total weight of the glass frit,
    at least one of the group II-based oxide and ZnO is contained in an amount of 0.1 wt % to 10 wt % based on the total weight of the glass frit,
    and
    the adhesion-enhancing component is contained in an amount of 1 wt % to 5 wt % based on the total weight of the glass frit.

9. The device of claim 8, wherein the group II-based oxide comprises at least one oxide selected from a group consisting of CaO, MgO and BaO, and wherein the adhesion-enhancing component comprises at least one metal oxide selected from a group consisting of $Co_3O_4$, NiO, $Fe_2O_3$ and $MnO_2$.

10. The device of claim 9, wherein the functional layer is in direct contact with the metal base.

11. The device of claim 9, wherein at least one of the cavity portion and the door comprises a buffer layer disposed between the metal base and the functional layer.

* * * * *